United States Patent
Higashi et al.

(10) Patent No.: US 11,846,336 B2
(45) Date of Patent: Dec. 19, 2023

(54) COMPLEX TITANATE COMPOUND, METHOD OF PREPARING SAME, AND FRICTION MATERIAL

(71) Applicant: KUBOTA CORPORATION, Osaka (JP)

(72) Inventors: Kenji Higashi, Amagasaki (JP); Masafumi Yasuda, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 556 days.

(21) Appl. No.: 16/622,311

(22) PCT Filed: Nov. 27, 2018

(86) PCT No.: PCT/JP2018/043474
§ 371 (c)(1),
(2) Date: Dec. 13, 2019

(87) PCT Pub. No.: WO2019/130941
PCT Pub. Date: Jul. 4, 2019

(65) Prior Publication Data
US 2020/0318702 A1  Oct. 8, 2020

(30) Foreign Application Priority Data
Dec. 26, 2017  (JP) ................. 2017-248821

(51) Int. Cl.
F16D 69/02 (2006.01)
C01G 23/00 (2006.01)

(52) U.S. Cl.
CPC ......... F16D 69/027 (2013.01); C01G 23/005 (2013.01); C01P 2004/61 (2013.01); C01P 2006/12 (2013.01); C01P 2006/14 (2013.01); F16D 2200/0043 (2013.01)

(58) Field of Classification Search
CPC .......................... F16D 69/027; C01G 23/005
See application file for complete search history.

(56) References Cited

U.S. PATENT DOCUMENTS 5,977,004 A     11/1999  Higashi et al.
2016/0221882 A1  8/2016  Muroya et al.

FOREIGN PATENT DOCUMENTS

| JP | 08-337660 A | 12/1996 |
| JP | 09-255337 A | 9/1997 |
| JP | 09-316429 A | 12/1997 |
| JP | 10-45413 A | 2/1998 |
| JP | 2010-030812 A | 2/2010 |
| JP | 2010-235730 A | 10/2010 |

(Continued)

OTHER PUBLICATIONS

Official Communication issued in International Patent Application No. PCT/JP2018/043474, dated Jan. 29, 2019.

Primary Examiner — James A Fiorito
(74) Attorney, Agent, or Firm — Keating & Bennett, LLP

(57) ABSTRACT

This composite titanium oxide compound is a composite titanium oxide compound wherein primary particles of an alkali metal titanate compound and primary particles of an alkaline earth metal titanate compound are joined to form secondary particles. The secondary particles have an average particle size of 1 to 80 μm. When the concentration of elements in the secondary particles is analyzed, a region where the alkaline earth metal is detected covers 50% or more of the surface area in 3% or less of the total number of secondary particles.

9 Claims, 3 Drawing Sheets

(56) References Cited

FOREIGN PATENT DOCUMENTS

| | | |
|---|---|---|
| JP | 2016-130183 A | 7/2016 |
| KR | 10-1998-026929 A | 7/1998 |
| WO | 2015/041244 A1 | 3/2015 |
| WO | 2017/012793 A1 | 1/2017 |

COMPLEX TITANATE COMPOUND, METHOD OF PREPARING SAME, AND FRICTION MATERIAL

TECHNICAL FIELD

The present invention relates to a complex titanate compound and a method of preparing it. The present invention relates also to a friction material containing a complex titanate compound.

BACKGROUND ART

Disclosed in Patent Document 1 is a complex titanate compound which, when used as a compounding agent in friction materials, contributes to improved stability of the friction coefficients of the friction materials and improved friction coefficients of the friction materials.

LIST OF CITATIONS

Patent Literature

Patent Document 1: JP-A-H08-337660

SUMMARY OF THE INVENTION

Problem to be Solved by the Invention

Out of consideration of the environment, there has been increasing demand chiefly in Europe and the United States for the development of friction materials containing no copper (copper-free friction materials). In copper-free friction materials, eliminating copper results in increased aggressiveness to the counterpart such as a disc which slides on the friction material, and the friction material inconveniently fixes to the damaged counterpart. When a friction material contains copper, due to its ductility and malleability, a cohesive film is formed on the surface of the counterpart. This film, acting as a protective film, is considered to help maintain a high friction coefficient under high temperature and prevent wear of the counterpart. However, with a copper-free friction material, no cohesive film of copper forms, and thus abrasion powder from the disk rotor and metal components contained in the friction material on the brake pad bite into the friction material and agglomerate there to form large metal lumps, which lodge between the brake pad and the disc rotor. The agglomerated metal lumps can abnormally attack the counterpart. That is, copper-free friction materials present a challenge of working out how to suppress aggressiveness to the counterpart.

A complex titanate compound which contributes to reduced aggressiveness of the friction material to the counterpart is useful not only in application to copper-free friction materials, but also in application to any other friction materials.

The present invention is aimed at providing a complex titanate compound which, when used as a compounding agent in friction materials, contributes to improved stability of the friction coefficients of the friction materials, improved friction coefficients of the friction materials, and reduced aggressiveness of the friction materials to the counterpart. The present invention is also aimed at providing a method for preparing such a complex titanate compound.

The present invention is also aimed at providing friction materials containing a complex titanate compound which, when used as a compounding agent in friction materials, contributes to improved stability of the friction coefficients of the friction materials, improved friction coefficients of the friction materials, and excellent performance of the friction materials in suppressing damage to the counterpart.

Means for Solving the Problem

To achieve the above object, the complex titanate compound according to one aspect of the present invention is a complex titanate compound in which primary particles of an alkali metal titanate compound and primary particles of an alkaline earth metal titanate compound bond to form secondary particles. The average particle diameter of the secondary particles is 1 to 80 µm, and element concentration analysis of the secondary particles finds that the number proportion of the secondary particles in which the region where an alkaline earth metal is detected occupies 50% or more of the surface area is 3% or less (a first configuration).

Preferably, the complex titanate compound of the first configuration described above contains at least either primary particles in which a part of the alkaline earth metal in the alkaline earth metal titanate compound is replaced with an alkali metal or primary particles in which a part of an alkali metal in the alkali metal titanate compound is replaced with an alkaline earth metal (a second configuration).

In the complex titanate compound of the first or second configuration described above, preferably, the alkali metal titanate compound is expressed by the formula $M_2Ti_nO_{2n+1}$ (where n is 5 to 7), where M is at least one of K and Na (a third configuration).

In the complex titanate compound of any one of the first to third configurations described above, preferably, the alkaline earth metal titanate compound is expressed by the formula $RTiO_3$, where R is at least one of Ca, Sr, and Ba (a fourth configuration).

In the complex titanate compound of any one of the first to fourth configurations described above, preferably, the specific surface area is 1 to 6 $m^2/g$ (a fifth configuration).

In the complex titanate compound of any one of the first to fifth configurations described above, preferably, the pore volume is 0.01 to 0.6 $cm^3/g$ (a sixth configuration).

To achieve the above object, a method of preparing a complex titanate compound according to another aspect of the present invention comprises a mixing step of mixing together a titanate compound, an alkali metal compound, and an alkaline earth metal compound with an average particle diameter of 2.0 µm or smaller and a sintering step of sintering the mixture obtained in the mixing step (a seventh configuration).

In the method of the seventh configuration described above, preferably, the alkaline earth metal compound has an average particle diameter of 1.0 to 2.0 µm (an eighth configuration).

To achieve the above object, according to another aspect of the present invention, a friction material comprises the complex titanate compound of any one of the first to sixth configurations (a ninth configuration).

Advantageous Effects of the Invention

According to the present invention, it is possible to provide a complex titanate compound which, when used as a compounding agent in friction materials, contributes to improved stability of the friction coefficients of the friction materials, improved friction coefficients of the friction materials, and reduced aggressiveness of the friction materials to the counterpart, and it is also possible to provide a method of its preparation.

According to the present invention, it is possible to provide friction materials containing a complex titanate compound which, when used as a compounding agent in friction materials, contributes to improved stability of the friction coefficients of the friction materials, improved friction coefficients of the friction materials, and reduced aggressiveness of the friction materials. That is, it is possible to provide friction materials with satisfactory stability of the friction coefficients, high friction coefficients, and less aggressiveness to the counterpart.

DESCRIPTION OF EMBODIMENTS

Figure 1:
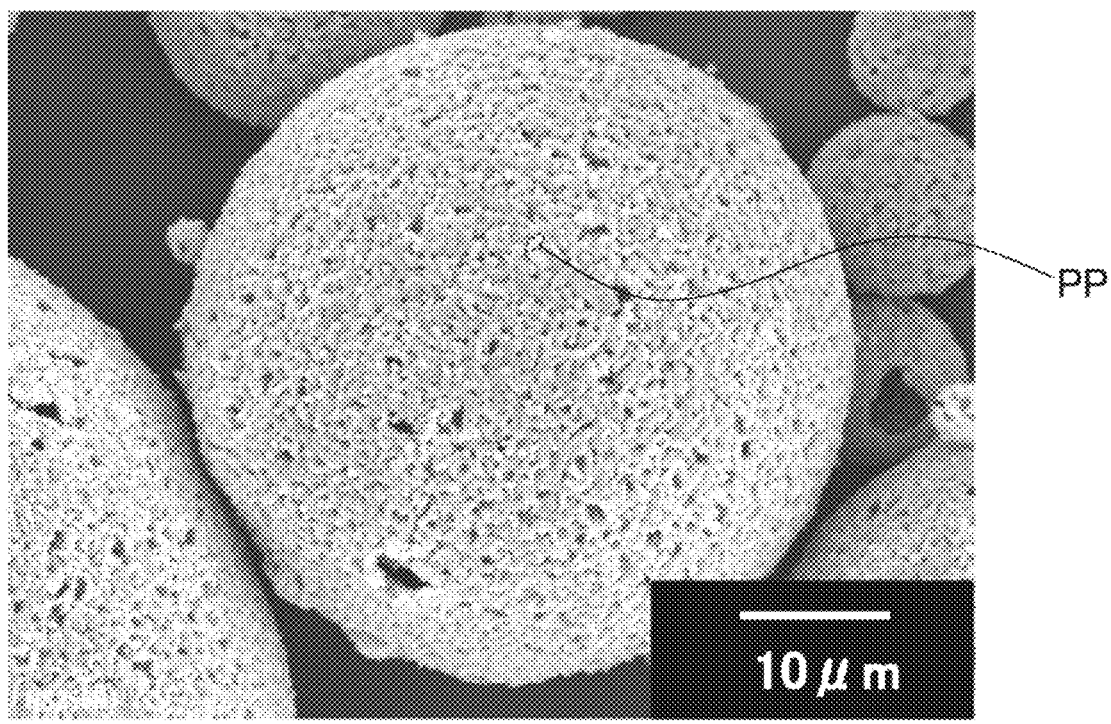
FIG. 1 An image of a complex titanate compound of Example 1 as observed on a scanning electron microscope.
Figure 1:
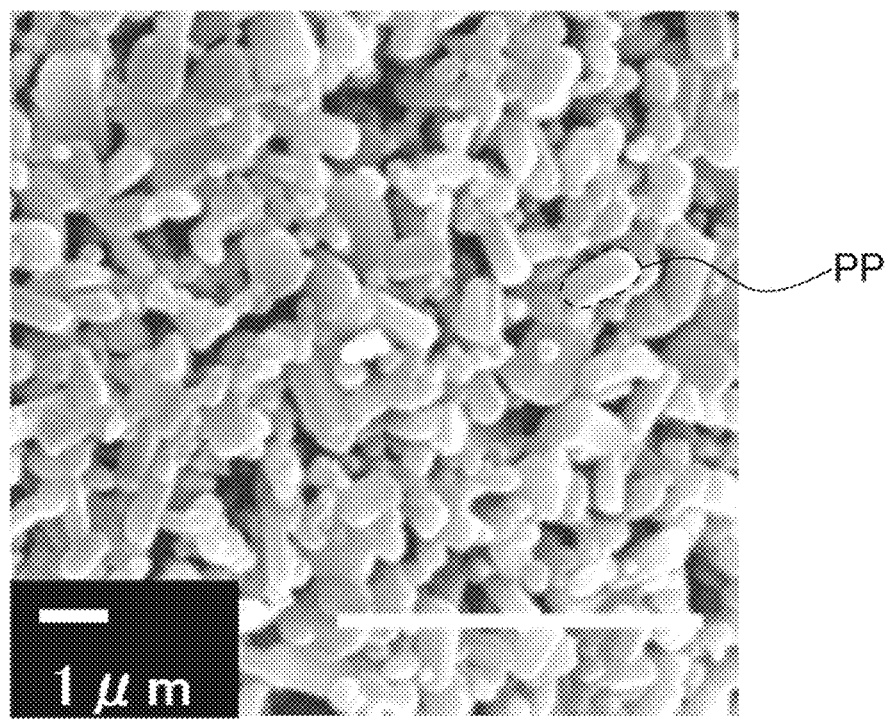

Complex titanate compounds embodying the present invention and friction materials embodying the present invention will be described below.

<1. Complex Titanate Compounds>

The present inventors have found that, in complex titanate compounds resulting from primary particles of an alkali metal titanate compound and primary particles of an alkaline earth metal titanate compound bonding together to form secondary particles, it is possible, by enhancing the dispersiveness of the alkaline earth metal, to produce a complex titanate compound which, when the complex titanate compound is used as a compounding agent in a friction material, contributes to improved stability of the friction coefficients of the friction material, increased friction coefficients of the friction material, and reduced aggressiveness of the friction material to the counterpart.

<1-1. Preparation Method>

A complex titanate compound according to the embodiment is prepared by a method including a mixing step and a sintering step.

In the mixing step, a titanate compound, an alkali metal compound, and an alkaline earth metal compound with an average particle diameter of 2.0 μm or smaller are mixed. In the mixing step, the raw materials in the form of powder as they are may be mixed to obtain a mixture, or those materials in the form of slurry with a proper amount of water added to them may be mixed and then dried with a spray dryer to obtain a granular powder (mixture). Here, appropriate spray-drying conditions are set such that secondary particles of the complex titanate compound have an average particle diameter of 1 to 80 μm. The average particle diameter means D50 as measured on a common laser-diffraction grain size distribution tester.

By setting the average particle diameter of the alkaline earth metal compound to 2.0 μm or smaller, as will be understood from the result of the friction test described later, it is possible to produce a complex titanate compound that contributes to reduced aggressiveness of the friction material to the counterpart.

Preferably, the alkaline earth metal compound has an average particle diameter of 1.0 to 2.0 μm. This is because, if the average particle diameter is smaller than 1.0 μm, the alkaline earth metal compound is likely to scatter during the mixture step, leading to poor workability. As will be understood from the result of the friction test described later, an average particle diameter of 1.0 μm or larger helps suppress aggressiveness of the friction material to the counterpart more than an average particle diameter smaller than 1.0 μm.

In the sintering step, the mixture obtained in the mixing step is sintered at a temperature in an appropriate range (for example, about 700 to 1300° C.) for an appropriate length of time (for example, 0.5 to 5 hours). Setting the processing temperature at about 700° C. or higher promotes formation of an alkaline earth metal titanate compound. Setting the processing temperature at about 1300° C. or lower helps avoid melting of the crystal of the alkali metal titanate compound.

Example 1

Purified anatase powder, potassium carbonate powder, and calcium carbonate with an average particle diameter of 1.9 μm were blended. The blending mole ratio of purified anatase powder:potassium carbonate powder:calcium carbonate was 7.03:1.0:1.0. Water (twice the total weight of the powder) was added to the blended raw materials to be mixed in the form of slurry, which was dried with a spray dryer to obtain granular powder. The granular powder was put in an aluminum crucible and was sintered in an electric furnace (processing temperature: 1100° C., processing duration: 1 hour and 50 minutes) to obtain a complex titanate compound.

An image of a complex titanate compound of Example 1 as observed on a scanning electron microscope is shown in FIG. 1. From the preparation method described above and the observation image in FIG. 1, it will be understood that, in a complex titanate compound of Example 1, primary particles of potassium titanate and primary particles of calcium titanate bond to form secondary particles. The particle diameter of each primary particle PP as observed from the observation image in FIG. 1 is about 1 μm.

Example 2

A complex titanate compound was obtained by a similar preparation method as in Example 1 except that the calcium carbonate had an average particle diameter of 1.2 μm. Also in the complex titanate compound of Example 2, as in the complex titanate compound of Example 1, primary particles of potassium titanate and primary particles of calcium titanate bond to form the secondary particles.

Example 3

A complex titanate compound was obtained by a similar preparation method as in Example 1 except that calcium carbonate had an average particle diameter of 0.15 μm. Also in the complex titanate compound of Example 3, as in the complex titanate compound of Example 1, primary particles of potassium titanate and primary particles of calcium titanate bond to form the secondary particles.

Comparative Example 1

A complex titanate compound was obtained by a similar preparation method as in Example 1 except that calcium carbonate had an average particle diameter of 3.2 μm. Also in the complex titanate compound of Comparative Example 1, as in the complex titanate compound of Example 1, primary particles of potassium titanate and primary particles of calcium titanate bond to form the secondary particles.

<1-2. Dispersiveness of Alkaline Earth Metal>

Figure 2:
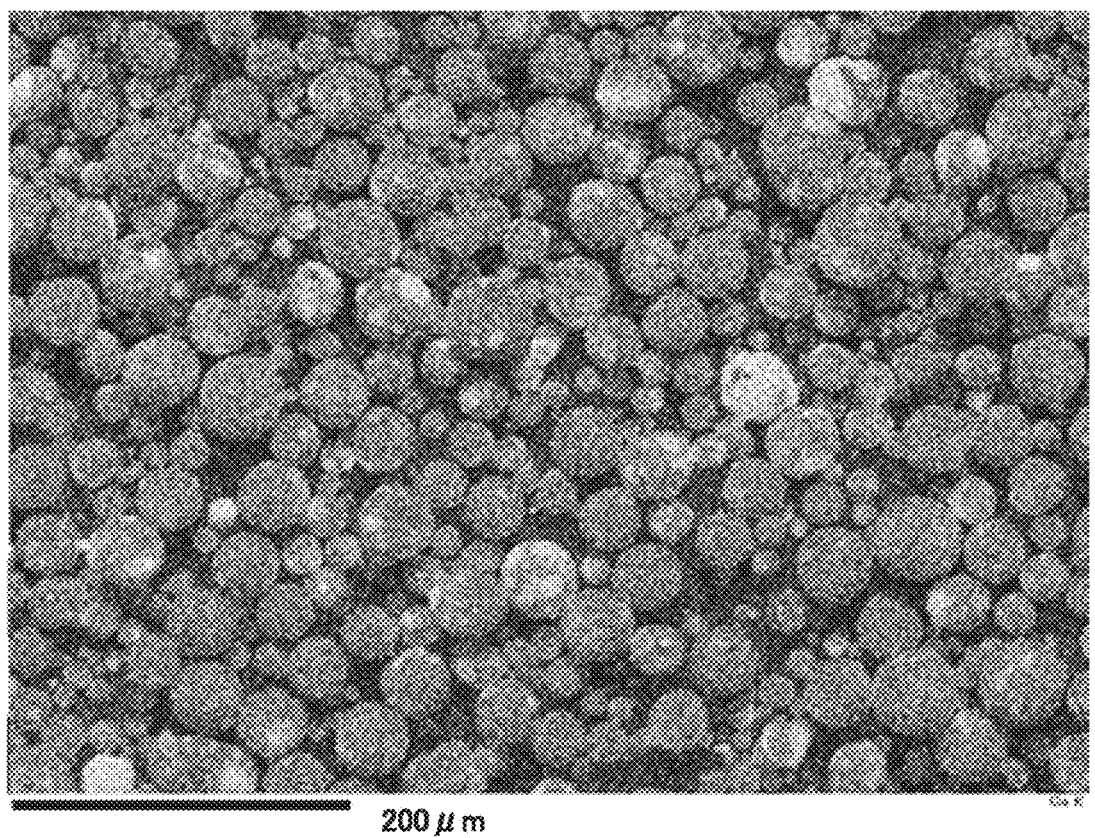
FIG. 2 A diagram showing one example of the result of calcium element concentration mapping in one field of view (with a rectangular inspection area of approximately 480 μm high by 640 μm wide).
Figure 3:
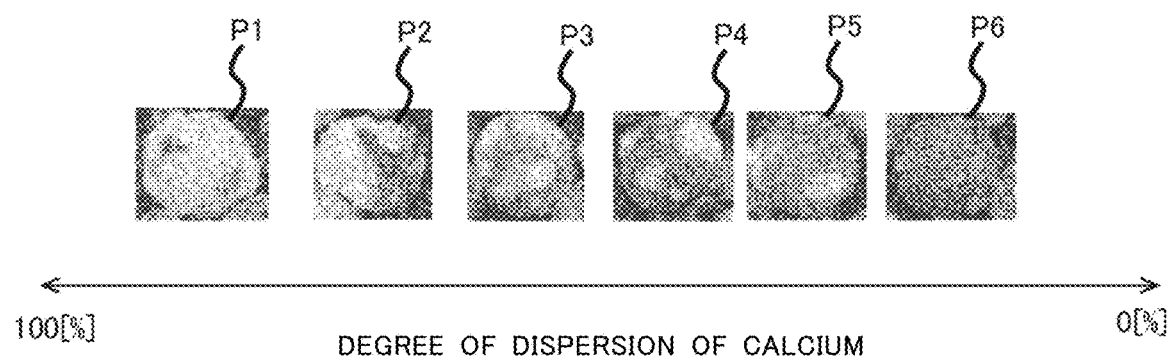
FIG. 3 A diagram showing examples of secondary particles in which the region where calcium was detected occupied 50% or more of the surface area and examples of secondary particles in which the region where calcium was detected occupied less than 50% of the surface area.

Each sample was inspected at a magnification of 200 times on the scanning electron microscope. With a rectangular inspection area of approximately 480 μm high by 640 μm wide was taken as a field of view, the total number A of secondary particles in a field of view was counted, and the number B of secondary particles in which the region where calcium was detected in a field of view occupied a proportion (%) of the surface area that falls within a predetermined range was counted. The percentage of the above number B with respect to the above number A was defined as a number proportion. Here, although the above numbers A and above B were counted with a rectangular inspection area of approximately 480 μm high by 640 μm wide was taken as a field of view, this is not meant to limit the range of a field of view. It is preferable to set the range of a field of view such that the above number A is at least 100 or more. For detection of calcium, calcium element concentration mapping by EDS analysis was used. In FIGS. 2 and 3, which will be described later, white regions are the regions where calcium was detected. FIG. 2 shows one example of the result of calcium element concentration mapping in a field of view mentioned above (with a rectangular inspection area of approximately 480 μm high by 640 μm wide). FIG. 3 is a diagram that shows examples of secondary particles P1 to P3 in which the region where calcium was detected occupied 50% or more of the surface area and examples of secondary particles P4 to P6 in which the region where calcium was detected occupied less than 50% of the surface area. Secondary particles P1 is an example of secondary particles in which the region where calcium was detected occupied approximately 85% of the surface area. Secondary particles P2 is an example of secondary particles in which the region where calcium was detected occupied approximately 72% of the surface area. Secondary particles P3 is an example of secondary particles in which the region where calcium was detected occupied approximately 55% of the surface area. Secondary particles P4 is an example of secondary particles in which the region where calcium was detected occupied approximately 33% of the surface area. Secondary particles P5 is an example of secondary particles in which the region where calcium was detected occupied approximately 20% of the surface area. Secondary particles P6 is an example of secondary particles in which the region where calcium was detected occupied approximately 1% of the surface area. Secondary particles in which the region where alkaline earth metal was detected occupied 50% or more of the surface area tend to have hard primary particles of an alkaline earth metal titanate agglomerated and present locally in secondary particles as coarse clusters of particles. Thus, the number proportion of secondary particles in which the region where the alkaline earth metal is detected occupies 50% of more of the surface area is preferably 3% or less, and more preferably 1% or less. Furthermore, the number proportion of secondary particles in which the region where alkaline earth metal is detected occupies 20% or less of the surface area is preferably 70% or more, more preferably 90% or more, and still more preferably 95% or more.

The number proportions shown in Table 1 are the average values of three number proportions obtained through counting in three fields of views for each of Example 1, Example 2, Example 3, and Comparative Example 1.

TABLE 1

| | D50 of Used Raw Material Calcium Carbonate | Measurement | Ca Occupation | | | | | | | | | | |
|---|---|---|---|---|---|---|---|---|---|---|---|---|---|
| | | | Total Number | 50% or more | | More than 40% but less than 50% | | More than 30% but 40% or less | | More than 20% but 30% or less | | 20% or less | |
| | [μm] | No. | A | B | [%] | B | [%] | B | [%] | B | [%] | B | [%] |
| Comparative Example 1 | 3.2 | 1 | 545 | 17 | 3.18 | 6 | 1.22 | 5 | 0.91 | 3 | 0.67 | 514 | 94.01 |
| | | 2 | 566 | 19 | | 8 | | 6 | | 5 | | 528 | |
| | | 3 | 522 | 16 | | 6 | | 4 | | 3 | | 493 | |
| Example 1 | 1.9 | 1 | 529 | 3 | 0.61 | 1 | 0.24 | 2 | 0.31 | 2 | 0.31 | 521 | 98.54 |
| | | 2 | 560 | 4 | | 2 | | 2 | | 2 | | 550 | |
| | | 3 | 555 | 3 | | 1 | | 1 | | 1 | | 549 | |
| Example 2 | 1.2 | 1 | 579 | 1 | 0.24 | 1 | 0.18 | 1 | 0.18 | 0 | 0.06 | 576 | 99.34 |
| | | 2 | 557 | 2 | | 1 | | 1 | | 1 | | 552 | |
| | | 3 | 531 | 1 | | 1 | | 1 | | 0 | | 528 | |
| Example 3 | 0.15 | 1 | 581 | 1 | 0.06 | 1 | 0.06 | 0 | 0.06 | 0 | 0.06 | 579 | 99.77 |
| | | 2 | 562 | 0 | | 0 | | 0 | | 0 | | 562 | |
| | | 3 | 571 | 0 | | 0 | | 1 | | 1 | | 569 | |

Reducing the average particle diameter of calcium carbonate as a raw material helps improve the dispersiveness of calcium in a complex titanate compound.

<1-3. Replacement of Alkali Metal and Alkaline Earth Metal>

Figure 4A:
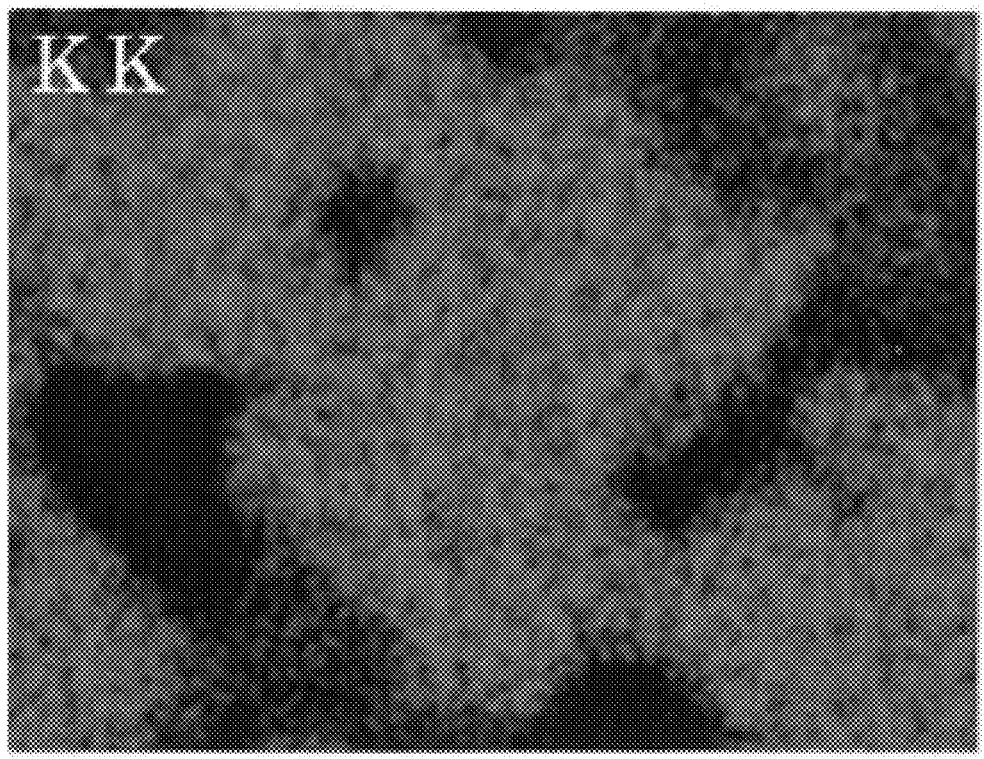
FIG. 4A A diagram showing a potassium element concentration map in the complex titanate compound of Example 1.
Figure 4B:
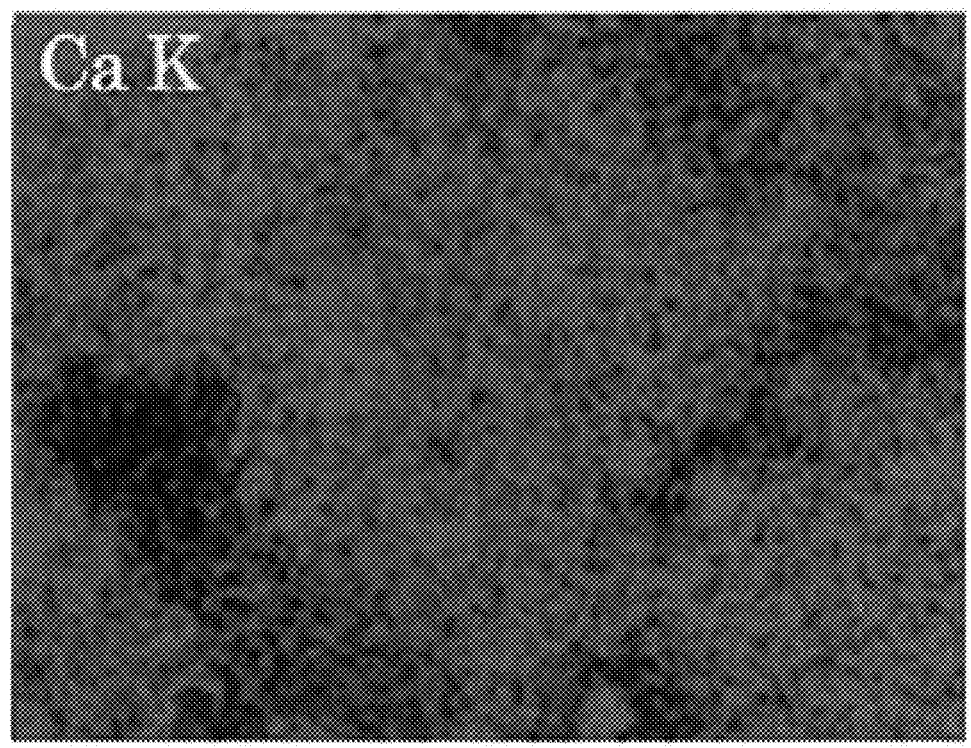
FIG. 4B A diagram showing a calcium element concentration map in the complex titanate compound of Example 1.

FIG. 4A shows a potassium element concentration map in the complex titanate compound of Example 1. FIG. 4B shows a calcium element concentration map in the complex titanate compound of Example 1. In FIGS. 4A and 4B, element concentration mapping was performed in the same rectangular measuring region of approximately 1.8 μm high by 2.4 μm wide.

A comparison between FIGS. 4A and 4B leads one to see that there are scattered regions where potassium and calcium overlap. In the regions where potassium and calcium overlap, it is inferred that a part of calcium in calcium titanate is replaced with potassium, or a part of potassium in potassium titanate is replaced with calcium. That is, it is inferred that the complex titanate compound of Example 1 contains at least either primary particles in which a part of calcium in calcium titanate is replaced with potassium or primary particles in which a part of potassium in potassium titanate is replaced with calcium.

Primary particles in which a part of calcium in calcium titanate is replaced with potassium are expected to reduce the Mohs hardness of a complex titanate compound, and hence such a complex titanate compound is expected, when used as a compounding agent in friction materials, to greatly contribute to reduced aggressiveness of the friction material to the counterpart.

Primary particles in which a part of calcium in calcium titanate is replaced with potassium are expected to greatly contribute to improved dispersiveness of calcium in complex titanate compounds.

Accordingly, it is preferable that a complex titanate compound contain primary particles in which a part of calcium of calcium titanate is replaced with potassium.

<1-4. Specific Surface Area>

The BET specific surface area of the complex titanate compound of Example 1 was 2.3 $m^2/g$. The BET specific surface area of the complex titanate compound of Example 2 was 2.8 $m^2/g$. The BET specific surface area of the complex titanate compound of Example 3 was 2.8 $m^2/g$. By contrast, the BET specific surface area of the complex titanate compound of Comparative Example 1 was 2.1 $m^2/g$.

It is preferable that the BET specific surface area be 1 to 6 $m^2/g$. When a complex titanate compound is used as a compounding material in a friction material, setting the BET specific surface area at 1 to 6 $m^2/g$ helps improve air pore formation and fade resistance of the friction material.

<1-5. Pore Volume>

The pore volume of all of the complex titanate compounds of Example 1, Example 2, Example 3, and Comparative Example 1 was 0.3 $cm^3/g$.

It is preferable that the pore volume be 0.01 to 0.6 $cm^3/g$. When a complex titanate compound is used as a compounding material in a friction material, setting the pore volume at 0.01 to 0.6 $cm^3/g$ helps improve air pore formation and fade resistance of the friction material.

<1-6. Analyzing Instruments>

The analyzing instruments used for analysis in Examples 1 to 3 and Comparative Example 1 described above are as follows.

The scanning electron microscope with an EDS analyzer: JSM-6510/JED-2300 manufactured by JEOL LIMITED The laser-diffraction grain size distribution tester: MT3300EX manufactured by MICROTRACBEL CORPORATION The BET specific surface area tester; BELSORP-mini II manufactured by NIPPONBEL CORPORATION The average pore diameter/pore volume tester: Poremaster-60 manufactured by QUANTACHROME <2. Friction Materials>

Using the complex titanate compounds of Example 1 and Comparative Example 1 respectively, Friction Material Example 1 and Friction Material Comparative Example 1 were prepared. A specific method of manufacturing those friction materials and their test results will be presented below.

<2-1. Preparation of Raw Materials>

For Friction Material Example 1 and Friction Material Comparative Example 1, ingredients were blended in the blending composition shown in Table 2 below. The complex titanate compound used in Friction Material Example 1 was the complex titanate compound of Example 1, and the complex titanate compound used in Friction Material Comparative Example 1 was the complex titanate compound of Comparative Example 1.

TABLE 2

|  | Blending Proportion (mass %) |
| --- | --- |
| Complex Titanate Compound | 18.3 |
| Aramid Fiber | 5.7 |
| Biosoluble Fiber | 7.6 |
| Zirconia | 17.9 |
| Zircon | 4.0 |
| Muscovite | 7.4 |
| Barium Sulphate | 14.9 |
| Tin Sulfide | 4.1 |
| Graphite | 5.0 |
| Rubber Powder | 2.0 |
| Cashew Dust | 2.0 |
| Calcium Hydroxide | 1.3 |
| Phenol Resin | 10.0 |

<2-2. Molding a Friction Material>

The ingredients listed above were mixed for three minutes with an EIRICH mixer. Then, the mixture was subjected to preliminary molding under a pressure of 16 MPa at normal temperature for two minutes. Then, it was subjected to hot molding under a pressure of 31 Mpa at 170° C. for 10 minutes. During hot molding, gas venting was performed by depressurizing twice. After hot molding, the product was subjected to thermal processing at 200° C. for five hours. Then, it was cut into predetermined dimensions and was polished. In this way, Friction Material Example 1 and Friction Material Comparative Example 1 were obtained.

<2-3. Friction Test>

For each of Friction Material Example 1, Friction Material Example 3, and Friction Material Comparative Example 1, abrasion tests were performed based on JASO C406 "Passenger car—Braking device—Dynamometer test procedures" and JASO C427 "Brake lining and disc brake pad—Wear test procedure on inertia dynamometer". The results of the friction tests are shown in Table 3. The friction coefficient in the second efficacy test of JASO C406 is the average of the friction coefficients at speeds of 50 km/h, 100 km/h, and 130 km/h. The friction coefficient is measured five times at each speed to calculate the average friction coefficient for each speed. The amount of wear in the JASO C427 wear test is the amount of wear after every 1000 times of braking.

TABLE 3

|  | Friction Material Example 1 | Friction Material Example 3 | Friction Material Comparative Example 1 |
| --- | --- | --- | --- |
| Friction coefficient at 50 km/h in second efficacy test | 0.39 | 0.37 | 0.39 |
| Friction coefficient at 100 km/h in second efficacy test | 0.38 | 0.37 | 0.40 |
| Friction coefficient at 130 km/h in second efficacy test | 0.41 | 0.40 | 0.42 |

TABLE 3-continued

|  | Friction Material Example 1 | Friction Material Example 3 | Friction Material Comparative Example 1 |
|---|---|---|---|
| Amount of wear in disc at 200° C. (μm) | 2.8 | 3.7 | 7.7 |
| Amount of wear in disc at 300° C. (μm) | 4.4 | 8.4 | 11.4 |

As shown in Table 3, with Friction Material Example 1 and Friction Material Example 3, the friction coefficients at the speeds of 50 km/h, 100 km/h, and 130 km/h were almost the same, and the stability of the friction coefficients was satisfactory. The friction coefficients of Friction Material Example 1 and Friction Material Example 3 at the speeds of 50 km/h, 100 km/h, and 130 km/h were as high as the friction coefficients of Friction Material Comparative Example 1 at the speeds of 50 km/h, 100 km/h, and 130 km/h.

The amounts of wear in the disc with Friction Material Example 1 and Friction Material Example 3 at 200° C. and 300° C. were smaller than the amount of wear in the disc with Friction Material Comparative Example 1. That is, it was confirmed that Friction Material Example 1 and Friction Material Example 3 can suppress aggressiveness of the friction material to the counterpart (disc) more than Friction Material Comparative Example 1. A complex of calcium titanate, which is a hard substance, with potassium titanate permits removal of excess substances produced between the friction material and the counterpart (disc). The more dispersed calcium is, the more uniformly the removing effect is exerted on the entire interface between the friction material and the counterpart (disc). Thus, it is presumed that the more dispersed calcium is, the less aggressiveness is exhibited to the counterpart (disc).

The amounts of wear in the disc with Friction Material Example 1 at 200° C. and 300° C. were smaller than the amount of wear in the disc with Friction Material Example 3. That is, it was confirmed that Friction Material Example 1 can suppress aggressiveness to the counterpart (disc) more than Friction Material Example 3.

<3. Others>

The description of embodiments of the present invention given above is in no way meant to limit the invention, and various modifications are possible without departing from the spirit of the present invention. That is, the embodiments described above should be considered to be illustrative in all respects and should not be considered to be restrictive. It should be understood that the technical scope of the present invention is defined by the scope of claims and encompasses any modifications made in a scope and sense equivalent to the scope of claims.

For example, although the alkali metal contained in complex titanate compounds is potassium in the examples mentioned above, also a composition where the alkali metal contained in a complex titanate compound is, for example, sodium or is, for example, potassium and sodium contributes, when used as a compounding agent in a friction material, to improved stability of the friction coefficients, improved friction coefficients of the friction material, and reduced aggressiveness of the friction material to the counterpart.

For another example, although, in the examples mentioned above, the alkaline earth metal contained in complex titanate compound is calcium, also a composition where the alkaline earth metal contained in a complex titanate compound is, for example, strontium, or is, for example, barium, or is, for example, at least any two of calcium, strontium and barium contributes, when used as a compounding agent in a friction material, to improved stability of the friction coefficients, improved friction coefficients of the friction material, and reduced aggressiveness of the friction material to the counterpart.

INDUSTRIAL APPLICABILITY

Complex titanate compounds according to the present invention are applicable to friction materials used in the sliding surface of disk pads, brake linings, and clutch facings in braking devices and power transmission controllers in, for example, automobiles, railway vehicles, aircraft, industrial machinery, and the like.

The invention claimed is:

1. A complex titanate compound in which primary particles of an alkali metal titanate compound and primary particles of an alkaline earth metal titanate compound bond to form secondary particles,
   wherein
   an average particle diameter of the secondary particles is 1 to 80 μm, and
   element concentration analysis of the secondary particles finds that a number proportion of the secondary particles in which a region where an alkaline earth metal is detected occupies 50% or more of a surface area is 3% or less.

2. The complex titanate compound according to claim 1, containing at least either
   the primary particles in which a part of the alkaline earth metal in the alkaline earth metal titanate compound is replaced with an alkali metal, or
   the primary particles in which a part of an alkali metal in the alkali metal titanate compound is replaced with an alkaline earth metal.

3. The complex titanate compound according to claim 1, wherein
   the alkali metal titanate compound is expressed by the formula $M_2Ti_nO_{2n+1}$ (where n is 5 to 7), where M is at least one of K and Na.

4. The complex titanate compound according to claim 1, wherein
   the alkaline earth metal titanate compound is expressed by the formula $RTiO_3$, where R is at least one of Ca, Sr, and Ba.

5. The complex titanate compound according to claim 1, wherein a specific surface area is 1 to 6 $m^2/g$.

6. The complex titanate compound according to claim 1, wherein a pore volume is 0.01 to 0.6 $cm^3/g$.

7. The complex titanate compound according to claim 1, wherein the alkaline earth metal titanate compound has an average particle diameter of 2.0 μm or smaller.

8. The complex titanate compound according to claim 1, wherein the alkaline earth metal titanate compound has an average particle diameter from 1.0 μm to 2.0 μm.

9. A friction material comprising the complex titanate compound according to claim 1.

* * * * *